(12) United States Patent
Baumgart et al.

(10) Patent No.: US 8,218,727 B2
(45) Date of Patent: Jul. 10, 2012

(54) SYSTEM FOR MEDICAL IMAGE PROCESSING, MANIPULATION AND DISPLAY

(75) Inventors: John Baumgart, Hoffman Estates, IL (US); Benita Devadas, South Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 270 days.

(21) Appl. No.: 12/781,946

(22) Filed: May 18, 2010

(65) Prior Publication Data

US 2011/0058653 A1 Mar. 10, 2011

Related U.S. Application Data

(60) Provisional application No. 61/239,824, filed on Sep. 4, 2009.

(51) Int. Cl.
*H05G 1/64* (2006.01)
(52) U.S. Cl. .......................... 378/98; 378/98.5
(58) Field of Classification Search .............. 378/91, 378/98, 98.2, 98.5, 162–165
See application file for complete search history.

(56) References Cited

U.S. PATENT DOCUMENTS

| | | | |
|---|---|---|---|
| 6,470,207 B1 | 10/2002 | Simon et al. | |
| 7,274,811 B2 | 9/2007 | Sirohey et al. | |
| 7,349,523 B2 | 3/2008 | Jenkins et al. | |
| 7,357,573 B2 | 4/2008 | Pescatore | |
| 7,374,077 B2 | 5/2008 | Shimura | |
| 8,126,226 B2 * | 2/2012 | Bernard et al. | 382/128 |
| 2004/0106916 A1 | 6/2004 | Quaid et al. | |
| 2006/0002519 A1 | 1/2006 | Jenkins et al. | |
| 2007/0165921 A1 | 7/2007 | Agam Gad et al. | |
| 2007/0211927 A1 | 9/2007 | Groszmann et al. | |
| 2008/0069477 A1 | 3/2008 | Engels et al. | |
| 2008/0118037 A1 | 5/2008 | Pescatore | |
| 2008/0130976 A1 | 6/2008 | Wang | |
| 2008/0185525 A1 | 8/2008 | Lyubchik et al. | |
| 2008/0221425 A1 | 9/2008 | Olson et al. | |
| 2008/0242968 A1 | 10/2008 | Claus et al. | |
| 2009/0093702 A1 | 4/2009 | Vollmer et al. | |
| 2010/0069742 A1 | 3/2010 | Partain et al. | |

* cited by examiner

*Primary Examiner* — Jurie Yun
(74) *Attorney, Agent, or Firm* — Alexander J Burke

(57) ABSTRACT

A system automatically adaptively adjusts an enlarged region of interest presented as a zoomed image on a secondary live display in response to X-ray filter (e.g., collimator) adjustment. An X-ray medical image user interface system includes one or more displays for displaying medical images. At least one display concurrently presents, a first image window including an X-ray image overview of a portion of patient anatomy and a second image window including an enlarged region of interest within the X-ray image overview. A collimator position detector provides a collimator signal in response to a detected collimator position. An image data processor automatically identifies the enlarged region of interest within the X-ray image overview in response to the collimator signal. A display processor generates data representing an image comprising the enlarged region of interest of the X-ray image overview in response to the identification of the enlarged region of interest within the X-ray image overview.

20 Claims, 9 Drawing Sheets

SYSTEM FOR MEDICAL IMAGE PROCESSING, MANIPULATION AND DISPLAY

This is a non-provisional application of provisional application Ser. No. 61/239,824 filed 4 Sep. 2009, by J. Baumgart et al.

FIELD OF THE INVENTION

This invention concerns an X-ray medical image user interface system including one or more displays for displaying medical images and an image depicting an enlarged region of interest within an X-ray image.

BACKGROUND OF THE INVENTION

In known X-ray systems, during an x-ray procedure, typically only one field of view of a portion of patient anatomy is supported at a time. A user has limited options to view a part of an image in detail and enlarged while still using X-ray imaging in providing an overview of the patient. These options include, after image acquisition, selecting a post processing zoom and pan function to manipulate the image to see a region of interest (ROI), then return to the X-ray image of the overview of the region of interest. These options may also include, changing the field of view by changing the zoom format of the detector and changing the table or X-ray system adjustable arm (e.g., C-arm) position to view the region of interest, and change back to a larger field of view to see the overview of the ROI. This manipulation is cumbersome and involves additional time consuming steps during an X-ray imaging procedure. A system according to invention principles addresses these deficiencies and related problems.

SUMMARY OF THE INVENTION

A system provides a secondary display of an enlarged region of interest, automatically selected in response to collimator position and a detected (or user selected) object position, on a secondary live display while concurrently presenting an overview X-ray image on a primary live display. An X-ray medical image user interface system includes one or more displays for displaying medical images. At least one display concurrently presents, a first image window including an X-ray image overview of a portion of patient anatomy and a second image window including an enlarged region of interest within the X-ray image overview. A collimator position detector provides a collimator signal in response to a detected collimator position. An image data processor automatically identifies the enlarged region of interest within the X-ray image overview in response to the collimator signal. A display processor generates data representing an image comprising the enlarged region of interest of the X-ray image overview in response to the identification of the enlarged region of interest within the X-ray image overview.

DETAILED DESCRIPTION OF THE INVENTION

A system according to invention principles provides a secondary display of an enlarged region of interest on a secondary live display while concurrently presenting an overview X-ray image on a primary live display. The enlarged region of interest is automatically selected in response to collimator position.

Figure 1:
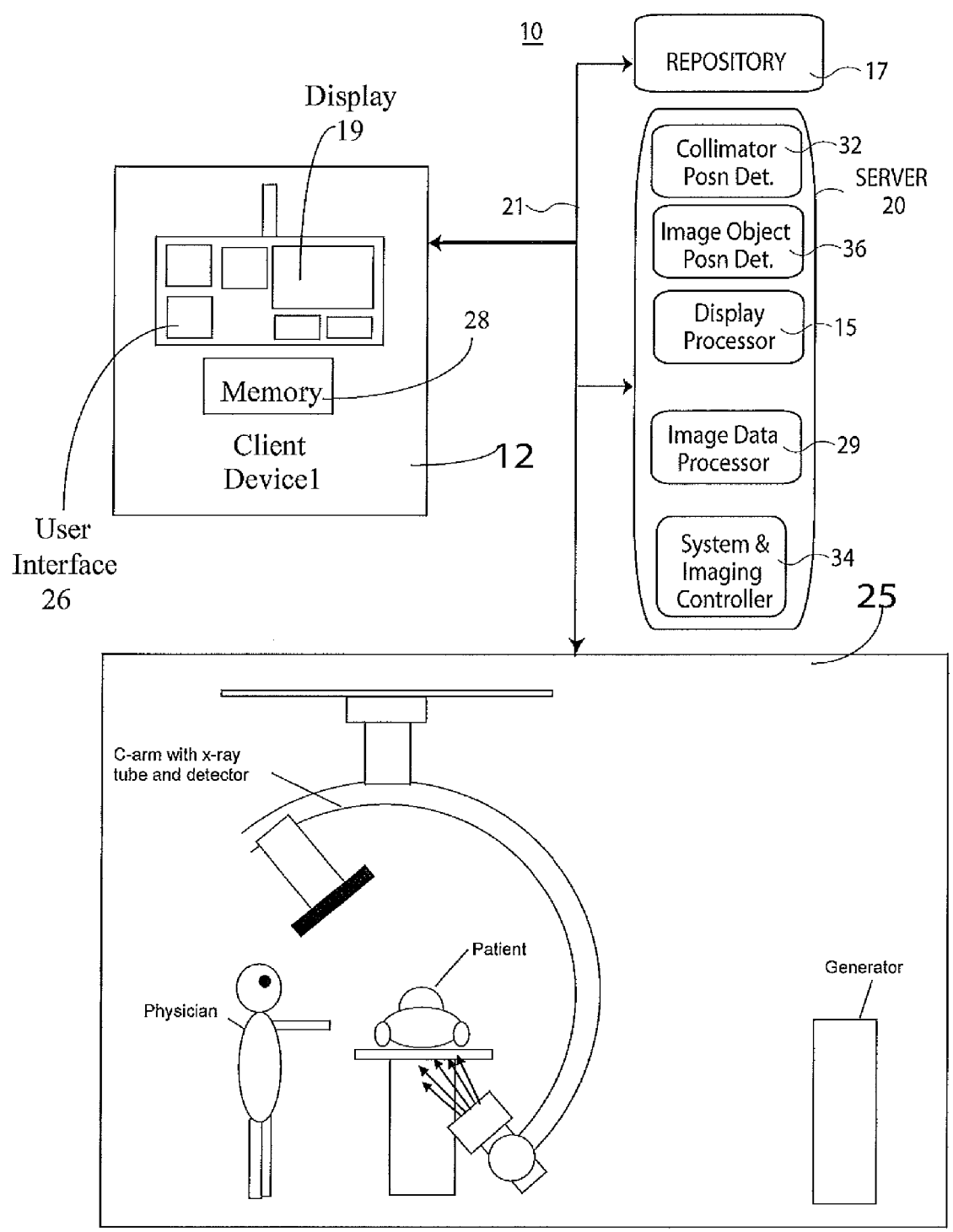
FIG. 1 shows an X-ray medical image user interface system including one or more displays for displaying medical images, according to invention principles.

FIG. 1 shows an X-ray medical image user interface system 10 including one or more displays for displaying medical images. System 10 includes one or more processing devices (e.g., computers, workstations or portable devices such as notebooks, Personal Digital Assistants, phones) 12 that individually include a user interface control device 26 such as a keyboard, mouse, touchscreen, voice data entry and interpretation device, at least one display 19 and memory 28. System 10 also includes at least one repository 17, X-ray imaging modality system 25 (which in an alternative embodiment may comprise an MR (magnetic resonance), CT scan, or Ultrasound system, for example) and server 20 intercommunicating via network 21. X-ray modality system 25 comprises a C-arm X-ray radiation source and detector device rotating about a patient table and an associated electrical generator for providing electrical power for the X-ray radiation system. The display images are generated in response to predetermined user (e.g., physician) specific preferences. At least one repository 17 stores medical image studies for multiple patients in DICOM compatible (or other) data format. A medical image study individually includes multiple image series of a patient anatomical portion which in turn individually include multiple images.

Server 20 includes display processor 15, image data processor 29, image object position detector 36, collimator position detector 32 and system and imaging controller 34. Display processor 15 provides data representing display images comprising a Graphical User Interface (GUI) for presentation on at least one display 19 of processing device 12. Imaging controller 34 controls operation of imaging device 25 in response to user commands entered via user interface 26. In alternative arrangements, one or more of the units in server 20 may be located in device 12 or in another device connected to network 21.

At least one display 19 concurrently presents, a first image window including an X-ray image overview of a portion of patient anatomy and a second image window including an enlarged region of interest within the X-ray image overview. Collimator position detector 32 provides a collimator signal in response to a detected collimator position. Image data processor 29 automatically identifies the enlarged region of interest within the X-ray image overview in response to the collimator signal. Display processor 15 generates data representing an image comprising the enlarged region of interest of the X-ray image overview in response to the identification of the enlarged region of interest within the X-ray image overview.

Figure 2:
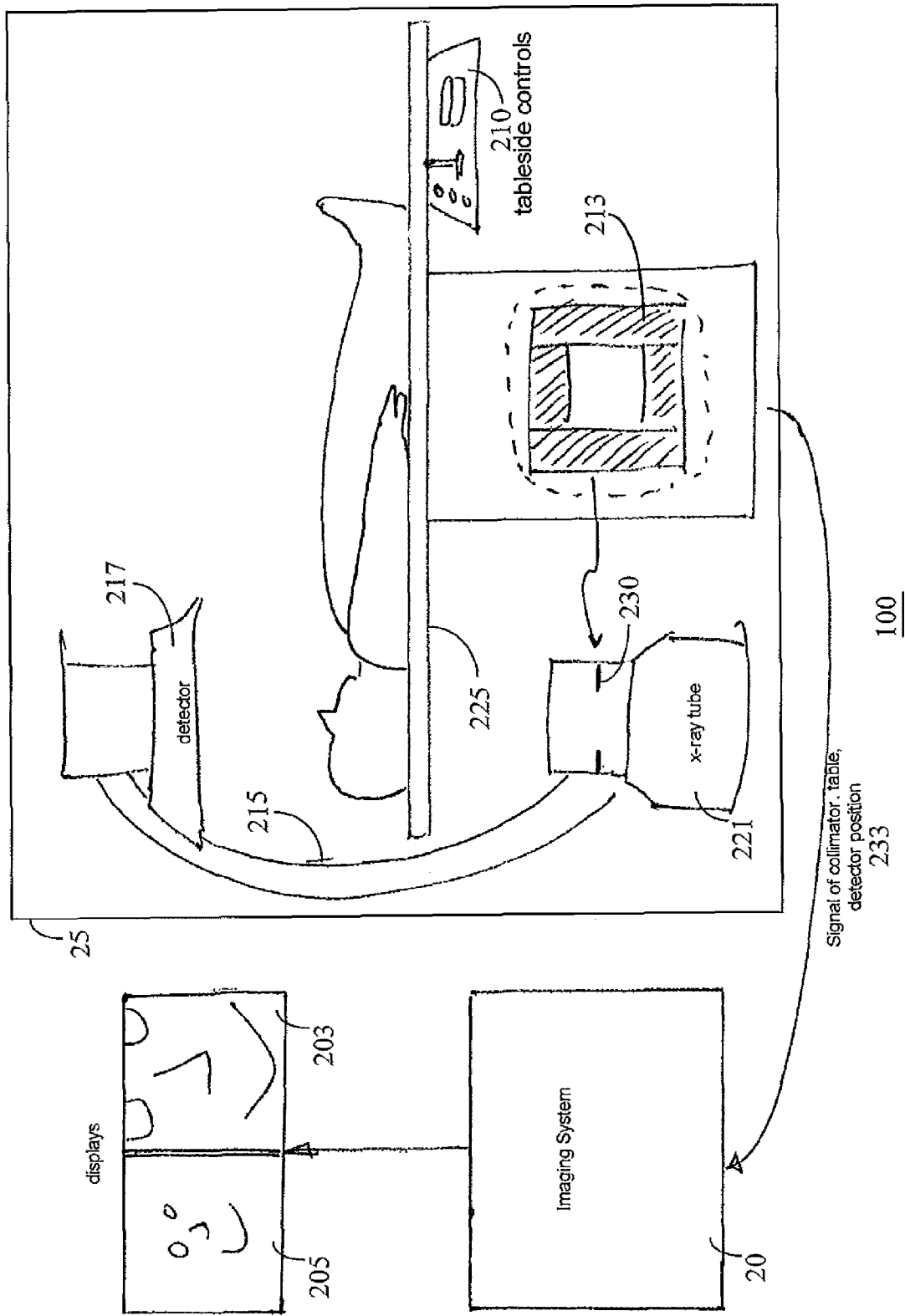
FIG. 2 illustrates interaction of X-ray medical image system adjustment and medical image display, according to invention principles.

FIG. 2 shows imaging system 100 showing interaction of X-ray medical image system adjustment and medical image display. System 100 advantageously provides a display mode enabling a user to view a zoomed region of interest of a live image on a secondary display 203 concurrently with an overview X-ray image on a primary display 205. The X-ray image may be native (e.g., a DR (digital radiography) Fluoroscopic image) or subtracted (e.g., a DSA (Digital Subtraction Angiography) Roadmap image). The region of interest that is zoomed may in one embodiment be automatically selected by default values, by manual user selection, by a user identifying a region of interest with a user interface (e.g. cursor control) device or may be automatically determined by server (computer system) 20 based on other parameters in the system that influence the region of interest, such as collimator 230 movement and position. Alternatively, the region of interest that is zoomed is automatically determined by server (computer system) 20 based on characteristics of the image that indicate the likely region of interest, such as based on automatic detection of location of an object (e.g. catheter marker, stent, appearance of contrast) within the image.

A user of the system adjusts collimator 230, the position of patient table 225, and the position of X-ray radiation detector 217 using tableside controls 210. Radiation detector 217 and radiation emitter 221 and collimator 230 are mounted on C-arm 215 rotatable about patient table 225 for X-ray imaging of a patient at variable angles. Tableside controls 210 enable a user to adjust zoom format of detector 217, position of table 225 and angle and position of C-arm 215 to view and acquire an image of a region of interest (ROI), and to revert to a larger field of view to see an overview of the ROI. In response to adjustment of position of table 225 and position of collimator 230 (illustrated in view 213 showing a view of the collimator from the detector 217 position), signals 233 indicating collimator position, radiation detector position and table position are provided to server unit 20 (including units 15, 29, 36, 32 and 34 as shown in FIG. 1). Further, in response to adjustment of position of table 225, radiation detector 217 and collimator 230 indicated by signals 233, image data processor 29 in server 20 recalculates the ROI of an enlarged display image so that it remains within a part of the patient exposed to radiation from emitter 221 attenuated by collimator 230 and shown in an overview image.

Figure 3:
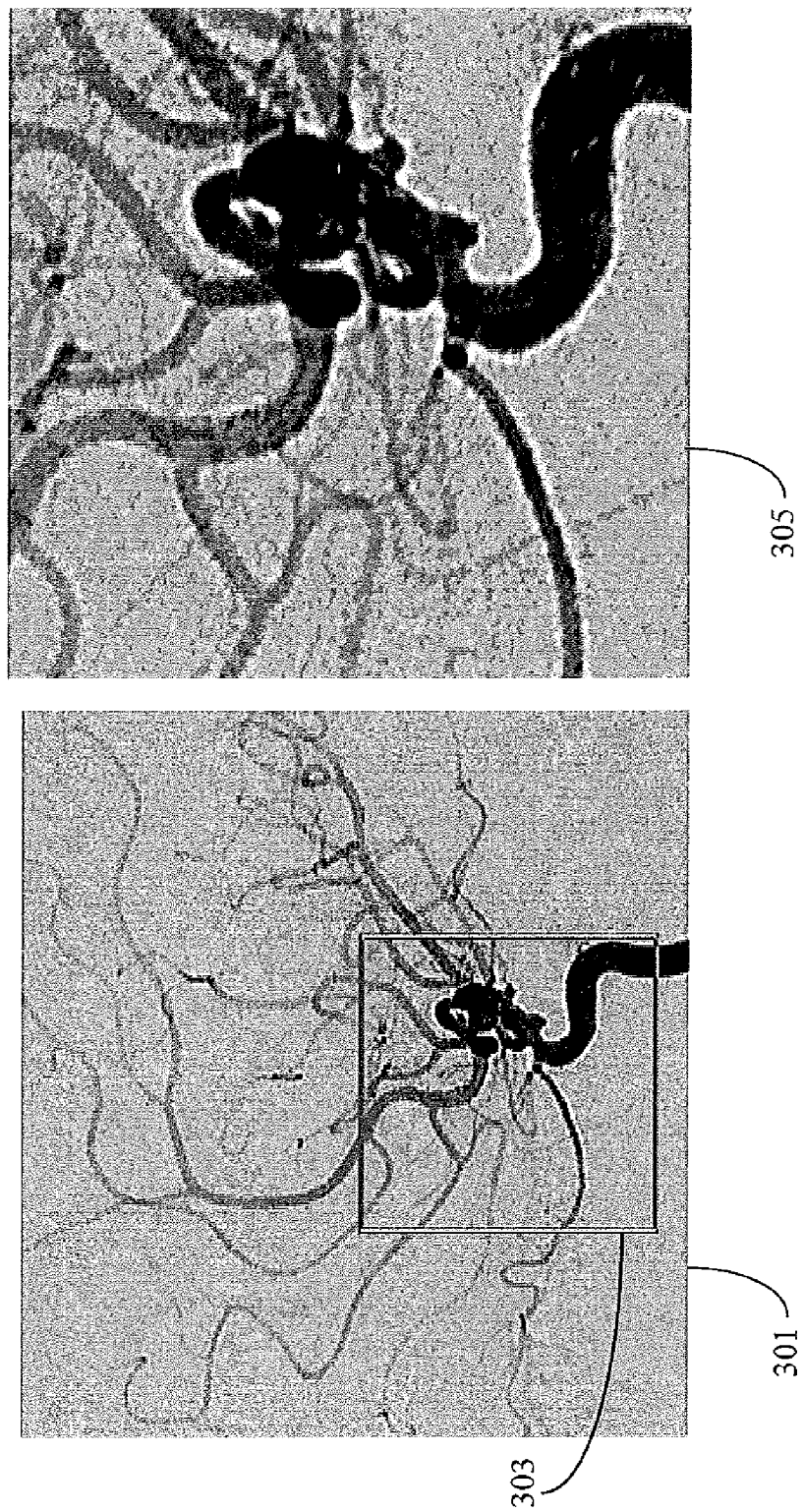
FIG. 3 illustrates identification of a region of interest to be zoomed and displayed in a secondary zoom display, according to invention principles.
Figure 5:
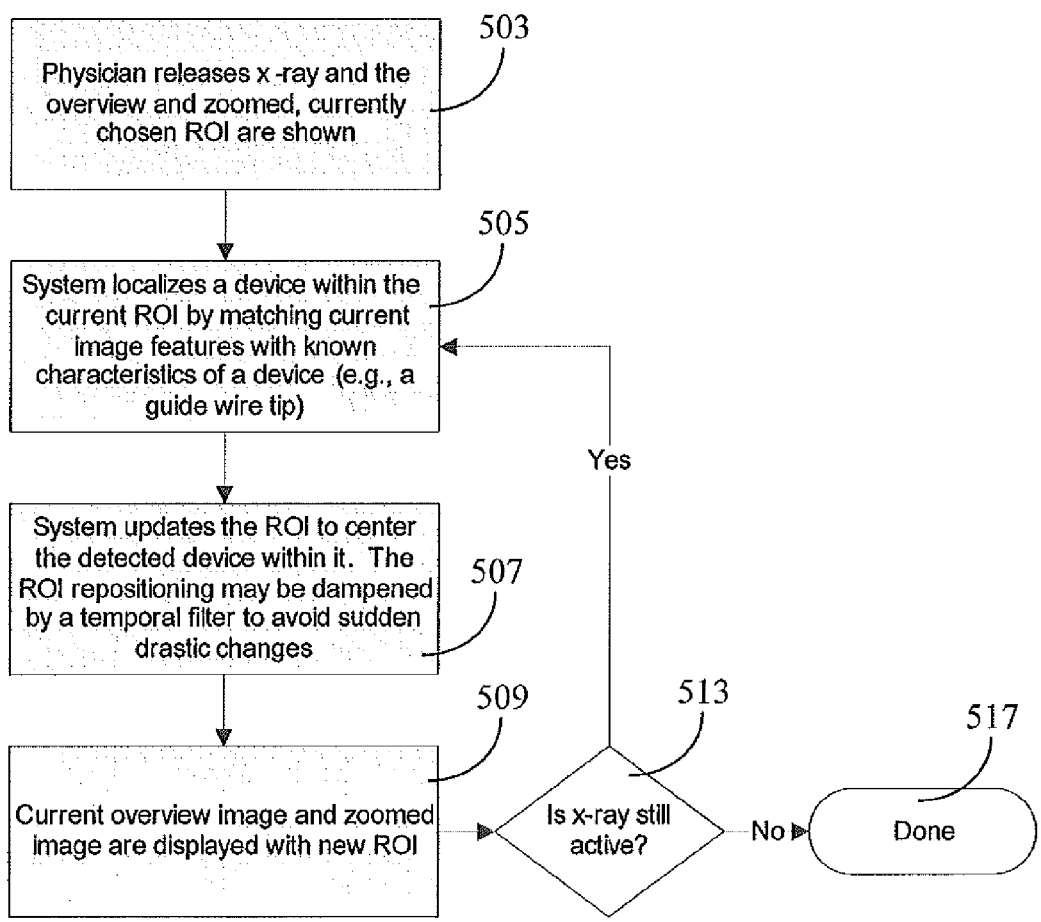
FIG. 5 shows a flowchart of a process involving localization of an invasive device element as a ROI to be zoomed, according to invention principles.

FIG. 5 shows a flowchart of a process involving localization of an invasive device element as a region of interest (ROI) to be zoomed. In step 503, a user identifies a ROI to be zoomed and displayed in a secondary zoom display as illustrated in FIG. 3. A user employs user interface 26 (FIG. 1) to select region of interest (ROI) 303 in overview image 301 (displayed on primary display 205 (FIG. 2)) to be zoomed and displayed on secondary display 203 (FIG. 2) in the secondary zoom display as image 305. The user selects ROI 303 of overview image 301 using user interface 26 and initiates X-ray imaging using system 25 (FIG. 1), causing the magnified view of image 305 to be shown on secondary display 203.

In step 505, image data processor 29 (FIG. 1) identifies a device within a user selected ROI. Specifically, processor 29 automatically localizes a device, a guide wire tip, within the image data of the ROI by matching current image features with known characteristics of a guide wire tip. The known characteristics of a guide wire tip comprise predetermined template image object shapes that are matched to an image object by edge detection and iterative rotation and zoom operations to determine a shape match.

Figure 4:
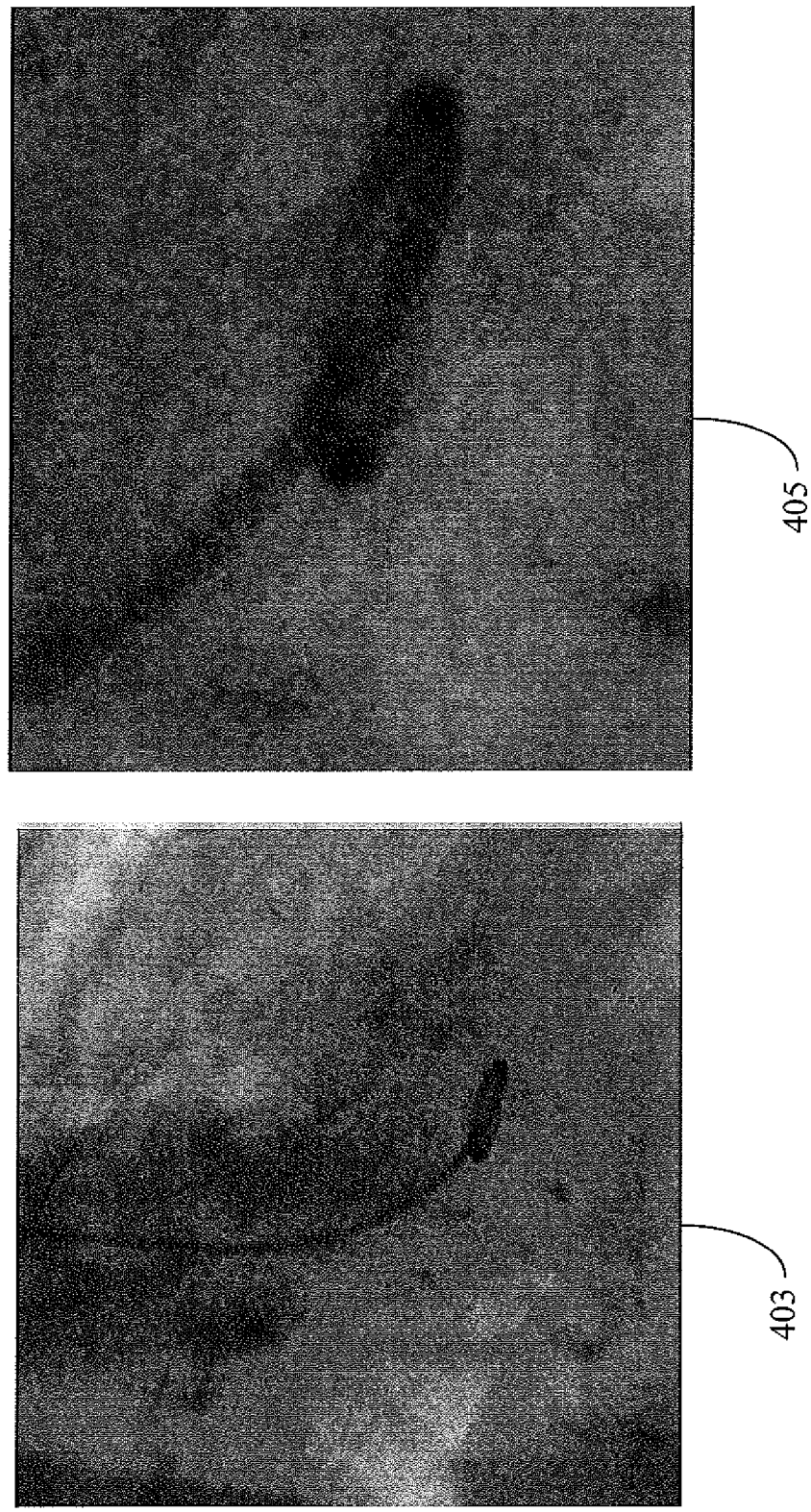
FIG. 4 illustrates selection of a guide wire tip as a region of interest for zoomed presentation in a secondary zoom display, according to invention principles.

FIG. 4 illustrates selection of a guide wire tip as a region of interest for zoomed presentation in a secondary zoom display. Image data processor 29 and image object position detector 36 automatically determine the location of the guide wire tip within image data of a ROI 403 of a patient using known image processing edge detection and object detection operations. In step 507 (FIG. 5), image data processor 29 reselects a new ROI centered on, and resized around, the determined location of the guide wire tip. Processor 29 dampens image data processing change caused by sudden change in ROI position and size by image data temporal filtering. Display processor 15 in step 509 generates data representing an overview image 403 and zoomed display 405 of the new ROI of the guide wire tip for presentation on displays 19. If it is determined in step 513 that X-ray imaging is continuing, the process of FIG. 5 is repeated from step 505. If it is determined in step 513 that X-ray imaging is complete, the process of FIG. 5 terminates at step 517.

Figure 6:
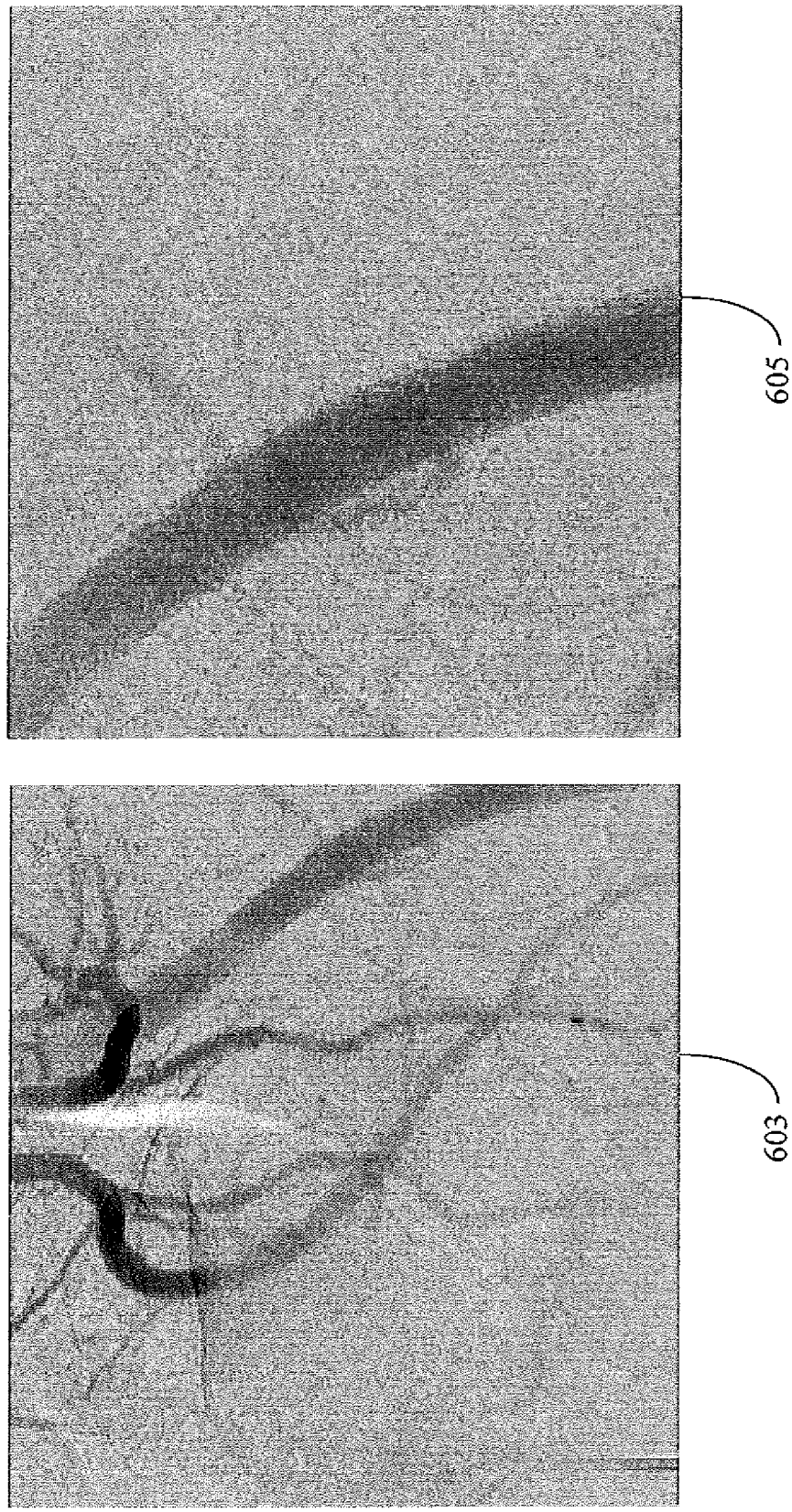
FIG. 6 illustrates selection of a region of interest for zoomed presentation in a secondary zoom display, according to invention principles.
Figure 8:
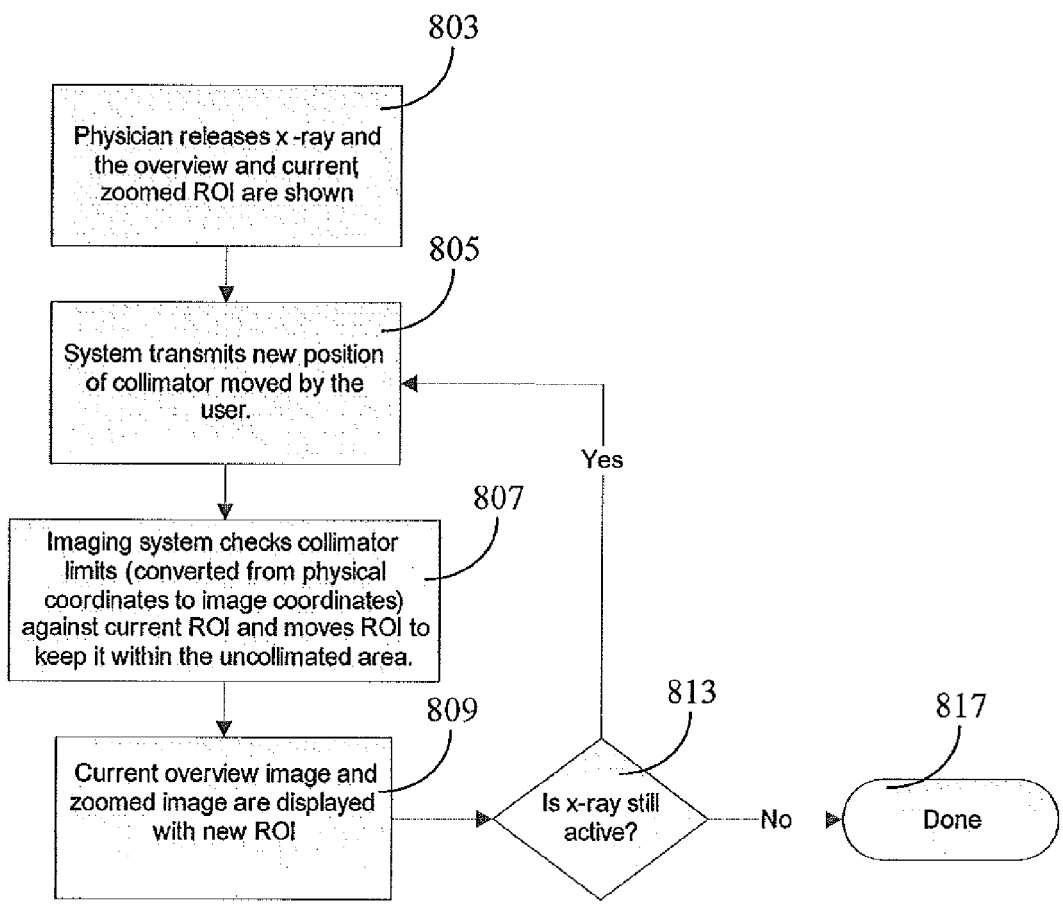
FIG. 8 shows a flowchart of a process for automatic adjustment of a zoomed ROI presented in a secondary zoom display in response to user adjustment of an X-ray collimator, according to invention principles.

FIG. 8 shows a flowchart of a process for automatic adjustment of a zoomed ROI presented in a secondary zoom display in response to user adjustment of an X-ray collimator. In step 803, a user employs X-ray imaging system 25 (FIG. 1) for acquiring an overview image and an image of a zoomed ROI within the overview image for presentation on adjacent display screens of displays 19. FIG. 6 illustrates selection of a region of interest for zoomed presentation in a secondary zoom display. Specifically, a user selects a ROI at the right edge of image 603 in a primary display of displays 19 and the ROI is zoomed and displayed as a secondary live zoom display 605 of displays 19.

Figure 7:
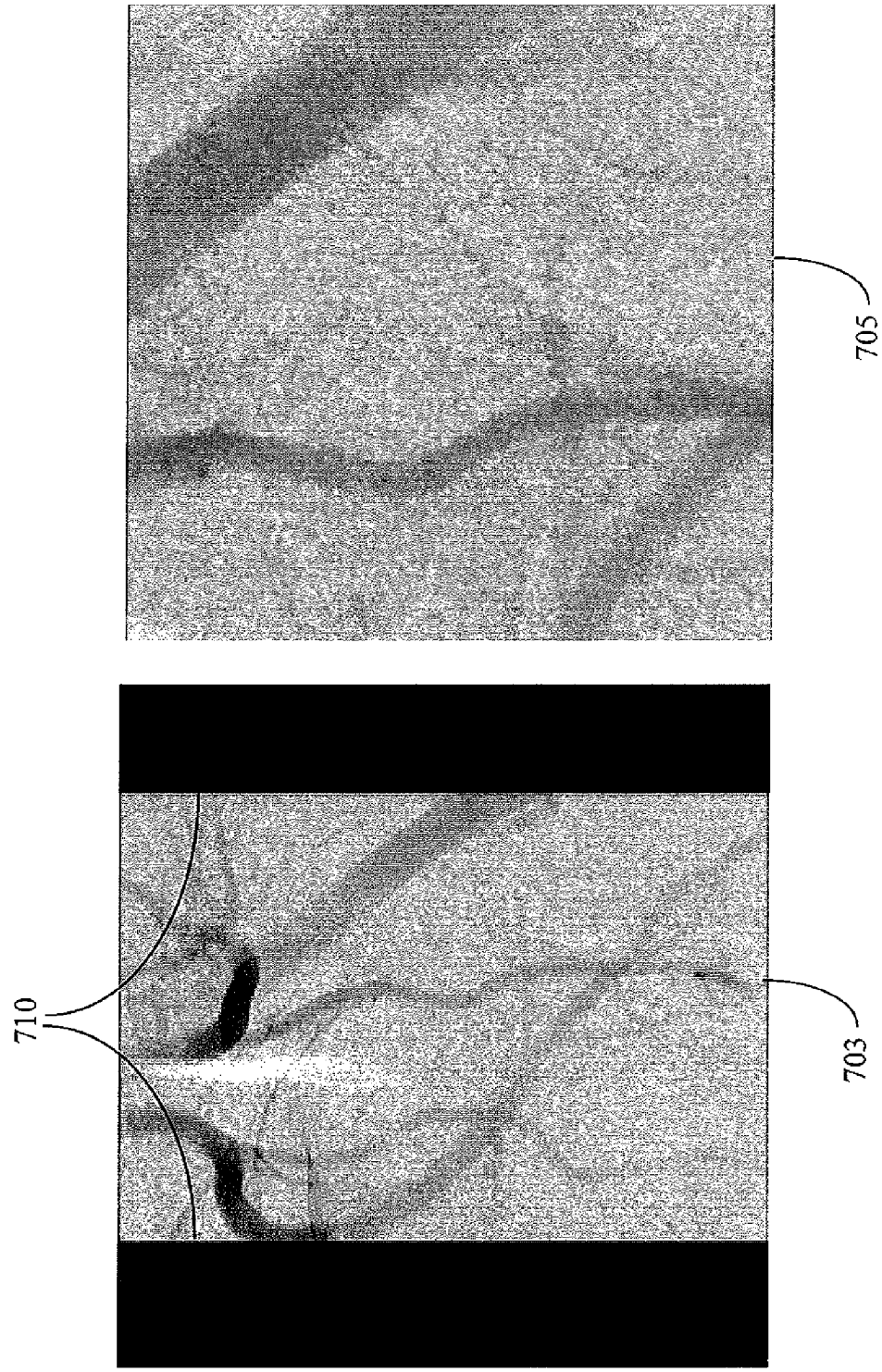
FIG. 7 illustrates automatic adjustment of a zoomed ROI presented in a secondary zoom display in response to user adjustment of an X-ray collimator and selection of a region of interest for zoomed presentation, according to invention principles.

In step 805, in response to user adjustment of collimator 230 (FIG. 1) signals 233 indicating collimator position and change in collimator position are communicated to image data processor 29 in server 20. Image data processor 29 in step 807 processes signals 233 to identify collimator position limits and to convert the collimator physical position limits to image compatible coordinates. Processor 29 compares collimator position limits against the zoomed ROI and if the ROI is partially or wholly in an X-ray area attenuated by collimator 230, processor 29 selects an adjusted ROI that is within an uncollimated (unattenuated) area. FIG. 7 illustrates automatic adjustment of the zoomed ROI presented in a secondary zoom display in response to user adjustment of X-ray collimator 230 and selection of a region of interest for zoomed presentation. Specifically, image 703 shows a user has closed in collimator 230 to position 710. Processor 29 automatically selects an adjusted ROI shown in image 705 that is within an uncollimated (unattenuated) area in response to the changed collimator position. The adjusted ROI is automatically moved to the left to show the uncollimated image in a secondary live zoom display of displays 19. Image data processor 29 also automatically similarly adjusts a ROI in response to other physical movements in the system (including patient table and radiation detector movement).

In step 809, display processor 15 generates data representing an overview image and zoomed adjusted ROI display 705 of the adjusted ROI for presentation on displays 19. If it is determined in step 813 that X-ray imaging is continuing, the process of FIG. 8 is repeated from step 805. If it is determined in step 813 that X-ray imaging is complete, the process of FIG. 8 terminates at step 817.

Figure 9:
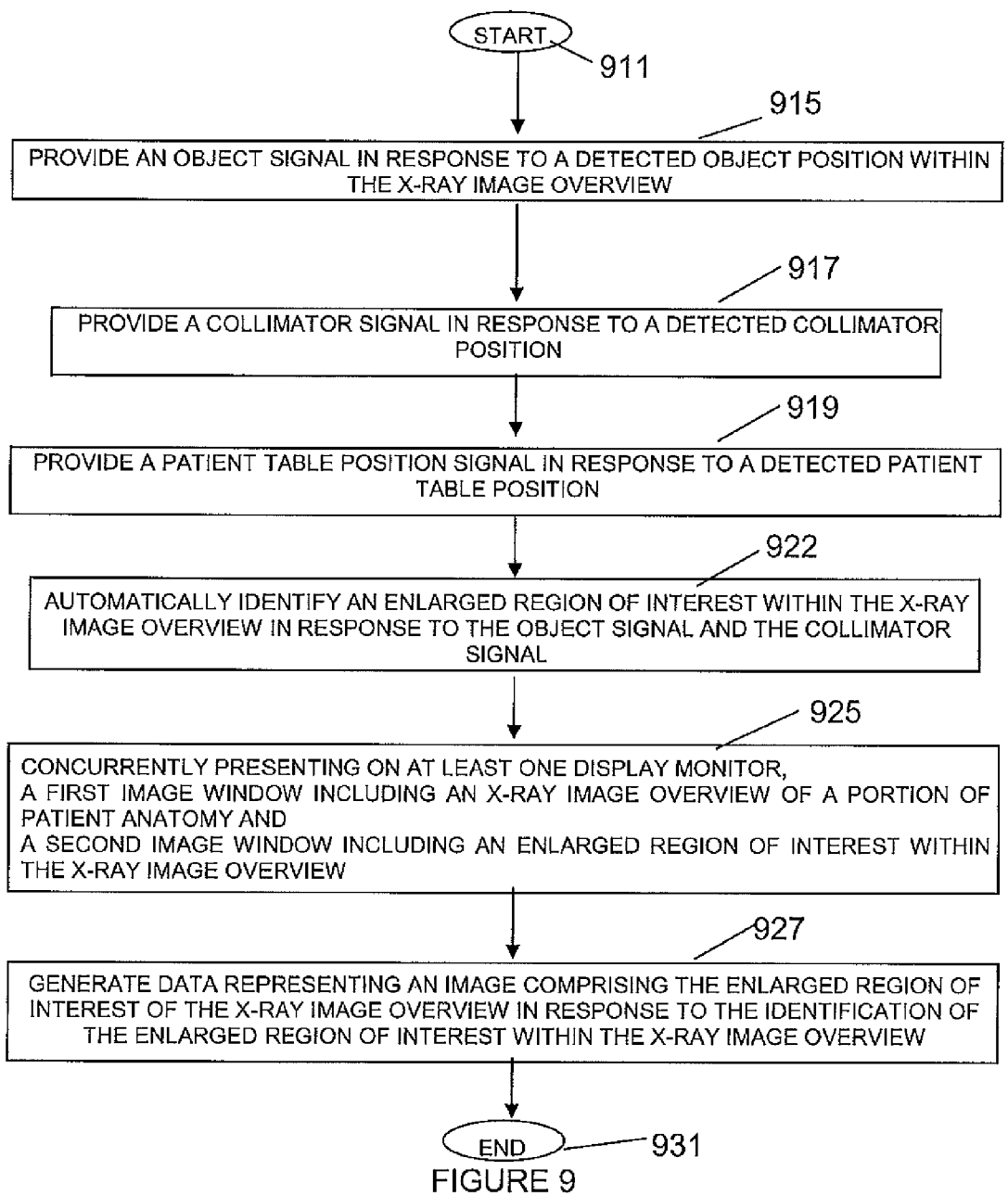
FIG. 9 shows a flowchart of a process performed by an X-ray medical image user interface system including one or more displays for displaying medical images, according to invention principles.

FIG. 9 shows a flowchart of a process performed by X-ray medical imaging and user interface system 10 (FIG. 1) including one or more displays 19 for displaying medical images. In step 915 following the start at step 911, image object position detector 36 provides an object signal in response to an identified object location within an X-ray image overview. The object within the X-ray image overview comprises at least one of, (a) a catheter marker, (b) a stent, (c) a contrast agent, (d) an implanted device or object, (e) a transient object and (f) a user identified landmark. Collimator position detector 32 in step 917 provides a collimator signal in response to a detected collimator position. A patient table position detector in unit 210 (FIG. 2) in step 919 provides a patient table position signal in response to a detected patient table position.

In step 922, image data processor 29 automatically identifies the enlarged region of interest within the X-ray image overview in response to one or more of, the object signal, a detected object position and user selection of an object in an image, the collimator signal and the patient table position signal. In one embodiment, image data processor 29 automatically identifies the enlarged region of interest within the X-ray image overview in response to user command or data entry. Alternatively, image data processor 29 automatically identifies the enlarged region of interest within the X-ray image overview in response to substantially identifying a center point or line resulting from narrowing a collimator field of view and using an image object edge detection function. In one embodiment, the system employs an object locator device for locating an object in 2D or 3D space. Such a device may employ a magnetic location system that identifies an object in space by its magnetic field and magnetic field detectors arranged in 3D or 2D to locate the device in space. An example of this is a system that provides magnetic navigation of catheters. The known position of the catheter being located in a field of view of an X-ray imaging system and used to determine the ROI being shown enlarged on the secondary display.

Image data processor 29 automatically adjusts the enlarged region of interest to be within an uncollimated region of the X-ray image overview, in response to one or more of a signal indicating movement of a patient support table and a signal indicating movement of a radiation detector. Image data processor 29 automatically tracks movement of the object and in response, adaptively moves the enlarged region of interest. Displays 19 comprising at least one display, concurrently present in step 925, a first image window including an X-ray image overview of a portion of patient anatomy and a second image window including an enlarged region of interest within the X-ray image overview. The first and second image windows are presented in first and second different displays areas respectively, designated and prioritized as primary and secondary displays respectively. In step 927, display processor 15 generates data representing the enlarged region of interest within the X-ray image overview in response to the identification of the enlarged region of interest within the X-ray image overview. The process of FIG. 9 terminates at step 931.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-9 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system provides a secondary display of an enlarged region of interest, automatically selected in response to one or more of, collimator position, patient table position and position of an object (e.g. stent) in an image overview, on a secondary live display while concurrently presenting an overview X-ray image on a primary live display. Further, the processes and applications may, in alternative embodiments, be located on one or more (e.g., distributed) processing devices on a network linking the units of FIG. 1. Any of the functions and steps provided in FIGS. 1-9 may be implemented in hardware, software or a combination of both.

What is claimed is:

1. An X-ray medical image user interface system including one or more displays for displaying medical images, comprising:

at least one display for concurrently presenting,
a first image window including an X-ray image overview of a portion of patient anatomy and a second image window including an enlarged region of interest within said X-ray image overview;
a collimator position detector for providing a collimator signal in response to a detected collimator position;
an image data processor for automatically identifying said enlarged region of interest within said X-ray image overview in response to said collimator signal; and
a display processor for generating data representing an image comprising said enlarged region of interest of said X-ray image overview in response to the identification of the enlarged region of interest within said X-ray image overview.

2. A system according to claim 1, wherein
said first and second image windows are presented in first and second different display areas respectively.

3. A system according to claim 2, wherein
said first and second different displays are designated and prioritized as primary and secondary displays respectively.

4. A system according to claim 1, wherein
said image data processor automatically identifies said enlarged region of interest within said X-ray image overview in response to substantially identifying a center point or line resulting from narrowing a collimator field of view.

5. A system according to claim 1, wherein
said image data processor automatically identifies said enlarged region of interest within said X-ray image overview in response to an identified location of an object within said X-ray image overview.

6. A system according to claim 5, wherein
said object within said X-ray image overview comprises at least one of, (a) a catheter marker, (b) a stent, (c) a contrast agent, (d) an implanted device or object, (e) a transient object and (f) a user identified landmark.

7. A system according to claim 1, wherein
said image data processor automatically identifies said enlarged region of interest within said X-ray image overview in response to user command or data entry.

8. An X-ray medical image user interface system including one or more displays for displaying medical images, comprising:
at least one display for concurrently presenting,
a first image window including an X-ray image overview of a portion of patient anatomy and
a second image window including an enlarged region of interest within said X-ray image overview;
an image object position detector for providing an object signal in response to a detected object position within said X-ray image overview;
a collimator position detector for detecting a collimator position;
an image data processor for determining said enlarged region of interest within said X-ray image overview in response to said object signal and the detected collimator position; and
a display processor for generating data representing an image comprising said enlarged region of interest of said X-ray image overview in response to the identification of the enlarged region of interest within said X-ray image overview.

9. A system according to claim 8, wherein
said object within said X-ray image overview comprises at least one of, (a) a catheter marker, (b) a stent, (c) a contrast agent.

10. A system according to claim 8, wherein
said image data processor automatically identifies said enlarged region of interest within said X-ray image overview using an image object edge detection function.

11. A system according to claim 8, wherein
said image data processor automatically tracks movement of said object and in response adaptively moves said enlarged region of interest.

12. A system according to claim 8, wherein
said collimator position detector provides a collimator signal in response to a detected collimator position and wherein
said image data processor automatically identifies said enlarged region of interest within said X-ray image overview in response to said collimator signal.

13. A method for displaying medical images on one or more displays, comprising the activities of:
concurrently presenting on at least one display,
a first image window including an X-ray image overview of a portion of patient anatomy and
a second image window including an enlarged region of interest within said X-ray image overview;
detecting position of a collimator;
generating a collimator signal in response to the detected collimator position;
automatically identifying said enlarged region of interest within said X-ray image overview in response to said collimator signal; and
generating data representing an image comprising said enlarged region of interest of said X-ray image overview in response to the identification of the enlarged region of interest within said X-ray image overview.

14. A method according to claim 13, wherein
said first and second image windows are presented on first and second different displays respectively.

15. A method according to claim 13, including
automatically adjusting said enlarged region of interest to be within an uncollimated region of said X-ray image overview.

16. A method according to claim 13, including
automatically adjusting said enlarged region of interest in response to a signal indicating movement of a patient support table.

17. A method according to claim 13, including
automatically adjusting said enlarged region of interest in response to a signal indicating movement of a radiation detector.

18. A method according to claim 13, including
automatically identifying said enlarged region of interest within said X-ray image overview in response to a detected position of an object.

19. A method according to claim 13, including
automatically identifying said enlarged region of interest within said X-ray image overview in response to user selection of an object.

20. A method according to claim 13, including
automatically identifying said enlarged region of interest within said X-ray image overview in response to position of an object detected by a magnetic field based object location system.

* * * * *